(12) United States Patent
Maiden

(10) Patent No.: US 8,908,910 B2
(45) Date of Patent: Dec. 9, 2014

(54) PROVISION OF IMAGE DATA

(75) Inventor: Andrew Maiden, Sheffield (GB)

(73) Assignee: Phase Focus Limited, Sheffield South Yorkshire (GB)

( * ) Notice: Subject to any disclaimer, the term of this patent is extended or adjusted under 35 U.S.C. 154(b) by 776 days.

(21) Appl. No.: 13/132,501

(22) PCT Filed: Dec. 4, 2009

(86) PCT No.: PCT/GB2009/051652
§ 371 (c)(1),
(2), (4) Date: Jun. 2, 2011

(87) PCT Pub. No.: WO2010/064051
PCT Pub. Date: Jun. 10, 2010

(65) Prior Publication Data
US 2011/0235863 A1 Sep. 29, 2011

(30) Foreign Application Priority Data
Dec. 4, 2008 (GB) .................................. 0822149.1

(51) Int. Cl.
- *G06K 9/00* (2006.01)
- *G01T 1/00* (2006.01)
- *G06T 11/00* (2006.01)

(52) U.S. Cl.
CPC .............. *G01T 1/00* (2013.01); *G06T 2211/424* (2013.01); *G06T 11/006* (2013.01)
USPC ........................................................ 382/103

(58) Field of Classification Search
USPC ........................................................ 382/103
See application file for complete search history.

(56) References Cited

U.S. PATENT DOCUMENTS

| | | | | |
|---|---|---|---|---|
| 4,480,332 | A * | 10/1984 | Strecker | 378/87 |
| 6,049,074 | A * | 4/2000 | Endo et al. | 250/208.1 |
| 6,369,932 | B1 * | 4/2002 | Gerchberg | 359/237 |
| 6,690,474 | B1 * | 2/2004 | Shirley | 356/603 |
| 6,906,839 | B2 * | 6/2005 | Gerchberg | 359/237 |
| 7,038,787 | B2 * | 5/2006 | Price | 356/484 |
| 7,792,246 | B2 * | 9/2010 | Rodenburg et al. | 378/43 |
| 2002/0060831 | A1 * | 5/2002 | Gerchberg | 359/237 |
| 2003/0156762 | A1 * | 8/2003 | August | 382/260 |
| 2004/0000630 | A1 * | 1/2004 | Spartiotis et al. | 250/208.1 |
| 2004/0217256 | A1 * | 11/2004 | Ortyn et al. | 250/201.4 |
| 2008/0095312 | A1 * | 4/2008 | Rodenburg et al. | 378/87 |
| 2010/0060962 | A1 * | 3/2010 | Rosen | 359/29 |
| 2010/0241396 | A1 * | 9/2010 | Rodenburg | 702/167 |
| 2011/0235862 | A1 * | 9/2011 | Roberts et al. | 382/103 |
| 2011/0235863 | A1 * | 9/2011 | Maiden | 382/103 |

FOREIGN PATENT DOCUMENTS

JP 2007-534956 A 11/2007

* cited by examiner

*Primary Examiner* — Jayesh A Patel
(74) *Attorney, Agent, or Firm* — Lando & Anastasi, LLP

(57) ABSTRACT

A method and apparatus are disclosed for providing image data. The method includes the steps of providing incident radiation from a radiation source at a target object and, via at least one detector, detecting an intensity of radiation scattered by the target object. Also via the at least one detector an intensity of radiation provided by the radiation source absent the target object is detected. Image data is provided via an iterative process responsive to the intensity of radiation detected absent the target object and the detected intensity of radiation scattered by the target object.

22 Claims, 3 Drawing Sheets

PROVISION OF IMAGE DATA

The present invention relates to a method and apparatus for providing image data of the type which may be utilised to construct an image of a region of a target object. In particular, but not exclusively, the present invention relates to a method of providing such image data using an iterative process making use of an unknown probe function.

Many types of imaging techniques are known for deriving spatial information about a target object (sometimes referred to as a specimen). For example in conventional transmission imaging an object is irradiated by plane wave illumination. The waves scattered by the object are re-interfered by a lens to form an image. In the case of very short wave length imaging (X-rays or electrons) this technique has many known difficulties associated with aberrations and instabilities introduced by the lens which limit the resolution and interpretability of the resulting image. Typical achievable resolution is many times larger than the theoretical limit. Other types of imaging techniques are known but many of these have problems such as resolution limits, long data gathering times or the need for complex and expensive equipment.

A technique for high resolution imaging has been disclosed in WO 2005/106531. This document, which is herein incorporated by reference for all purposes, discloses a method and apparatus of providing image data for constructing an image of a region of a target object which includes the steps of providing incident radiation from a radiation source at a target object. Via at least one detector, detecting the intensity of radiation scattered by the target object and providing image data responsive to the detected intensity without high resolution positioning of the incident radiation or a post target object aperture relative to the target object. Also disclosed is a method for providing such image data via an iterative process using a moveable softly varying probe function such as a transmittance function or illumination function.

Those skilled in the art now refer to the technique disclosed in WO 2005/106531 as the ptychographical iterative engine (or PIE). This is a powerful technique for the recovery of image data relating to an area of an object from a set of diffraction pattern measurements. Each diffraction pattern is formed by illuminating an object with a known wave front of coherent radiation with the requirement that the intensity of the wave front is concentrated within a localised lateral region where it interacts with the object. Examples of such a wave front would be that generated a short distance beyond an aperture when it is illuminated by a plane wave, or the focal spot generated by a convex lens illuminated by a plane wave. The technique is also applicable to scenarios where a target is illuminated by plane wave radiation and a post target object aperture is used to select illumination scattered by a region of the object.

In this sense a diffraction pattern is the distribution of intensity produced by an optical configuration some distance beyond the object and at a plane normal to the direction of propagation of the illumination wave front. This plane is designated as the measurement plane and measurements made at this plane are denoted $\Psi_k(u)$ with u being an appropriate coordinate vector. It is to be noted that when the distance between the measurement plane and a sample plane is small the diffraction pattern is known as a near-field diffraction pattern. When this distance is large the diffraction pattern is known as a far-field diffraction pattern.

Ptychography relies upon the recording of several diffraction patterns at the measurement plane using a suitable recording device such as a CCD camera or the like. The lateral positions of the object and the localised illumination wave front are different for each pattern.

In order to provide useful image data characteristics of a probe function which might be a transmittance function associated with a post target object aperture or an illumination function associated with incident radiation itself must be known or estimated. This either requires time consuming set up techniques or can lead to inaccuracies if the probe function used is in accurate. Furthermore the iterative process can be time consuming.

It is an aim of the present invention to at least partly mitigate the above-mentioned problems.

It is an aim of certain embodiments of the present invention to provide a method and apparatus suitable for providing image data which may or may not be used to construct an image of a region of a target object and which can be utilised without careful knowledge of a probe function being required.

It is an aim of certain embodiments of the present invention to provide a method and apparatus for providing image data in which an iterative process is used which produces useful results in an efficient manner.

According to a first aspect of the present invention there is provided a method of providing image data for constructing an image of a region of a target object, comprising the steps of:

providing incident radiation from a radiation source at a target object and, via at least one detector, detecting an intensity of radiation scattered by the target object;

via the at least one detector, detecting an intensity of radiation provided by the radiation source absent the target object; and providing image data via an iterative process responsive to the intensity of radiation detected absent the target object and the detected intensity of radiation scattered by the target object.

According to a second aspect of the present invention there is provided apparatus for providing image data for generating an image of a region of a target object, comprising:

locating means for locating a target object at a predetermined location;

a radiation source for providing incident radiation at a target object located by the locating means;

at least one detector device for detecting an intensity of radiation scattered by the target object locating means for locating incident radiation or a post-target aperture at one or more locations with respect to the target object; and processing means for providing image data via an iterative process responsive to an intensity of radiation detected absent the target object and a detected intensity of radiation scattered by the target object.

Certain embodiments of the present invention provide the advantage that during an iterative process a probe function is itself iteratively calculated step by step with a running estimate of the probe function being utilised to determine running estimates of an object function associated with the target object.

Certain embodiments of the present invention provide the advantage that illumination from an optical set up without a target may be efficiently measured before and/or after analysing a target object. This obviates the need for a probe function to be measured at other times.

Certain embodiments of the present invention provide a method of providing high resolution images using image data gathered via an iterative process and constructing an image therefrom.

Certain embodiments of the present invention provide the advantage that image data indicating characteristics of a target object may be provided which may then be processed as data so as to determine some other characteristic of a target object. As such an image is not necessarily constructed using the image data.

Embodiments of the present invention will now be described hereinafter, by way of example only, with reference to the accompanying drawings in which.

In the drawings like reference numerals refer to like parts.

Figure 1:
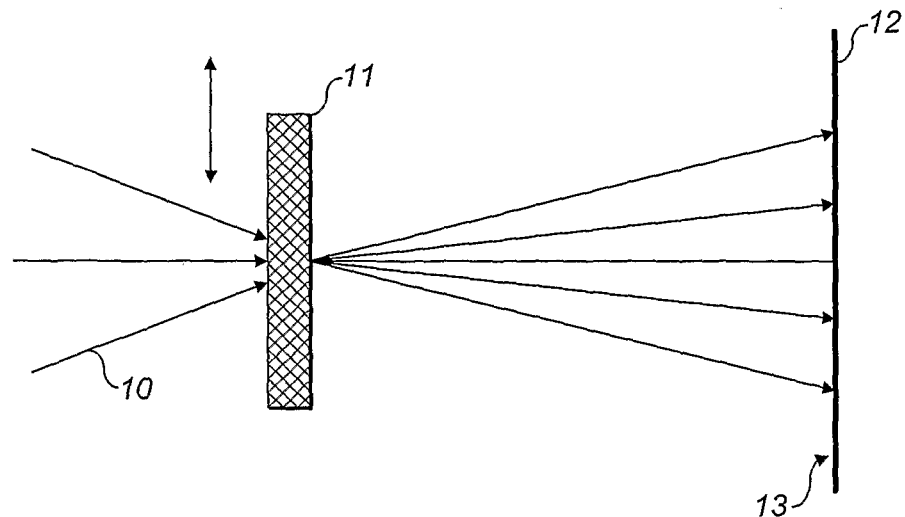
FIG. 1 illustrates incident at a target object.

FIG. 1 illustrates how a scattering pattern may be developed and used to determine image data corresponding to information about the structure of a target object. It will be understood that the term target object refers to any specimen or item placed in the path of incident radiation which causes scattering of that radiation. It will be understood that the target object should be at least partially transparent to incident radiation. The target object may or may not have some repetitive structure. Alternatively the target object may be wholly or partially reflective in which case a scattering pattern is measured based on reflected radiation.

Incident radiation 10 is caused to fall upon the target object 11. It is to be understood that the term radiation is to be broadly construed as energy from a radiation source. This will include electro magnetic radiation including X-rays, emitted particles such as electrons and/or acoustic waves. Such radiation may be represented by a wave function $\Psi(r)$. This wave function includes a real part and an imaginary part as will be understood by those skilled in the art. This may be represented by the wave functions modulus and phase. $\Psi(r)^*$ is the complex conjugate of $\Psi(r)$ and $\Psi(r) \Psi(r)^* = |\Psi(r)|^2$ where $|\Psi(r)|^2$ is an intensity which may be measured for the wave function.

The incident radiation 10 is scattered as it passes through and beyond the specimen 11. As such the wave function of the incident radiation as it exits the specimen will be modified in both amplitude and phase with respect to the wave function of the incident radiation at the pre-target side of the specimen. The scattering which occurs may include Fourier diffraction, refraction and/or Fresnel diffraction and any other form of scattering in which characteristics of the incident radiation are modified as a result of propagating after the specimen. If an array of detectors such as a CCD detector 12 is arranged a long distance from the specimen then a diffraction pattern is formed at a diffraction plane 13. A Fourier diffraction pattern will form if the detectors 12 are located a distance D from the specimen where D is sufficiently long for the diffraction pattern to be formed effectively from a point source. If the diffraction plane is formed closer to the specimen, by locating the detectors nearer, then a Fresnel diffraction pattern will be formed.

The incident radiation 10 falls upon a first surface of a target object 11. The incident radiation is scattered in the specimen and transmitted radiation propagates through to a diffraction plane 13 where a diffraction pattern forms.

Figure 2:
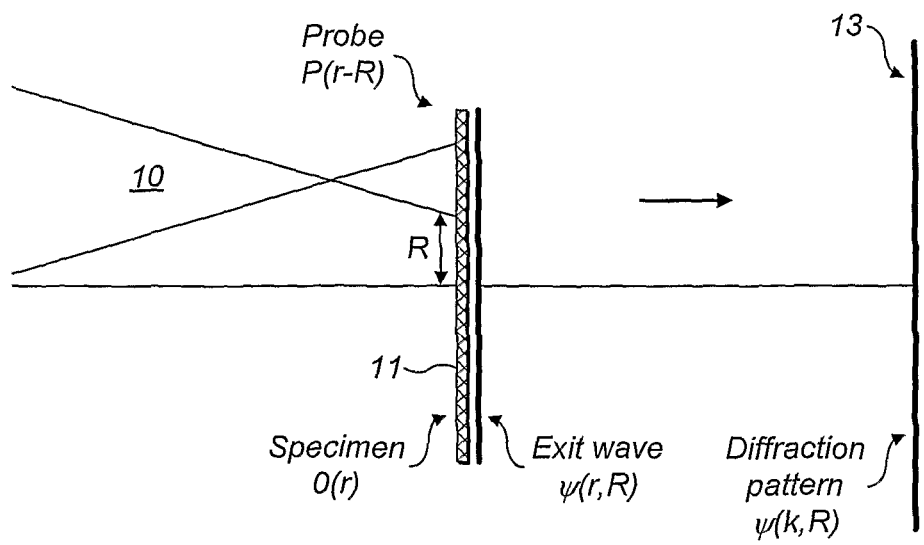
FIG. 2 illustrates a Probe Function and formation of a diffraction pattern with a target object.

FIG. 2 illustrates the process of FIG. 1 in more detail. The radiation 10 is roughly focused, for example by a weak lens, so that a region of a first surface of the target object is illuminated. The weak lens may of course comprise any appropriate focusing apparatus such as a set of plates and a voltage supply for a beam of electrons or a reflective surface for X-rays. The weak focusing is sufficient to substantially confine the probing radiation beam. It is thus not necessary to sharply focus radiation although of course strongly focussed radiation could be used. Here the target object provides an object function $O(r)$ which represents the phase and amplitude alteration introduced into an incident wave as a result of passing through the object of interest. The illuminating radiation incident on the target object represents a probe function $P(r)$ which forms an illumination function such as that generated by a caustic or illumination profile formed by the lens or other optical component. $P(r)$ is the complex stationary value of this wave field calculated at the plane of the object. The exit wave function $\psi(r,R)$ defines the scattered radiation as it exits the downstream surface of the target object. As this exit wave propagates through space it will form a diffraction pattern $\Psi(u)$ at the diffraction plane 13.

It will be understood that rather than weakly (or indeed strongly) focusing illumination on a target, unfocused radiation can be used with a post target aperture. An aperture is located post target object to thereby select a region of the target for investigation. The aperture is formed in a mask so that the aperture defines a "support". A support is an area of a function where that function is not zero. In other words outside the support the function is zero. Outside the support the mask blocks the transmittance of radiation. The term aperture describes a localised transmission function of radiation. This may be represented by a complex variable in two dimensions having a modulus value between 0 and 1. An example is a mask having a physical aperture region of varying transmittance.

Incident radiation would thus fall upon the up-stream side of the specimen and be scattered by the specimen as it is transmitted. A specimen wave $O(r)$ is thus formed as an exit wave function of radiation after interaction with the object. In this way $O(r)$ represents a two-dimensional complex function so that each point in $O(r)$, where r is a two-dimensional coordinate, has associated with it a complex number. $O(r)$ will physically represent an exit wave that would emanate from the object which is illuminated by a plane wave. For example, in the case of electron scattering, $O(r)$ would represent the phase and amplitude alteration introduced into an incident wave as a result of passing through the object of interest. The aperture provides a probe function $P(r)$ (or transmission function) which selects a part of the object exit wave function for analysis. It will be understood that rather than selecting an aperture a transmission grating or other such filtering function may be located downstream of the object function. The probe function $P(r-R)$ is an aperture transmission function where an aperture is at a position R. The probe function can be represented as a complex function with its complex value given by a modulus and phase which represent the modulus and phase alterations introduced by the probe into a perfect plane wave incident up it.

The exit wave function $\psi(r,R)$ is an exit wave function of radiation as it exits the aperture. This exit wave $\psi(r,R)$ forms a diffraction pattern $\Psi(u)$ at a diffraction plane. Here r is a vector coordinate in real space and u is a vector coordinate in diffraction space.

It will be understood that with both the aperture formed embodiment and the non-aperture embodiment described with respect to FIGS. 1 and 2 if the diffraction plane at which scattered radiation is detected is moved nearer to the specimen then Fresnel diffraction patterns will be detected rather than Fourier diffraction patterns. In such a case the propagation function from the exit wave $\psi(r,R)$ to the diffraction pattern $\Psi(u)$ will be a Fresnel transform rather than a Fourier transform.

Figure 3:
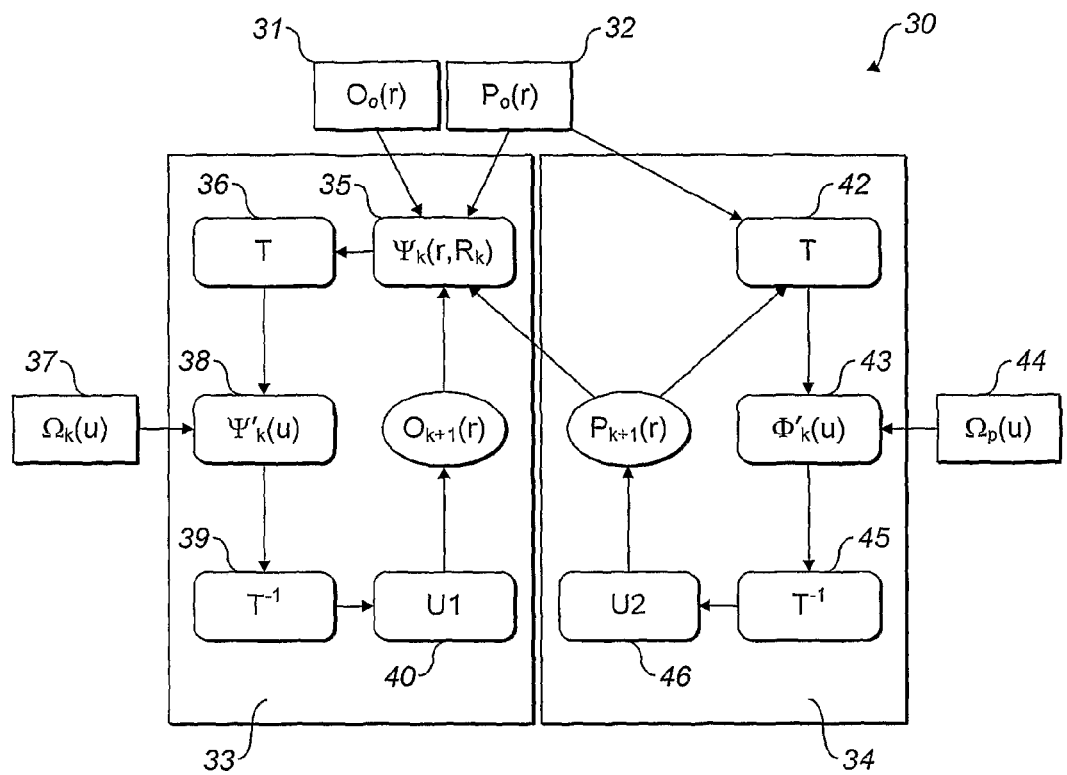
FIG. 3 illustrates a phase retrieval algorithm.

FIG. 3 illustrates an iterative process according to an embodiment of the present invention which can be used to recover image data of the type which can be used to construct an image of an area of an object from a set of diffraction patterns. The iterative process 30 illustrated begins with a guess 31 at the object and a guess 32 at the form of a probe function used. Subsequently these initial guesses are replaced by running guesses in the iterative process. The initial guesses for the image and/or probe function can be random distributions or can themselves be precalculated approximations based on other measurements or prior calculations. The guesses are modelled at a number of sample points and are thus represented by matrices. Such matrices can be stored and manipulated by a computer or other such processing unit. Aptly the sample points are equally spaced and form a rectangular array. The probe function estimation after k iterations is denoted by $P_k(r)$ and the recovered image after k iterations by $O_k(r)$. The original guesses for the probe function and objection function are thus $P_0(r)$ and $O_0(r)$ respectively where r is an appropriate coordinate vector.

If the current translation vector relating to the relative positions of the object and the probe function is denoted $R_k$ then the interaction between the guessed-at object distribution and the probe function is modelled by $$\psi_k(r,R_k) = O_k(r) P_k(r-R_k) \qquad 1$$

This is the current exit wave front. According to embodiments of the present invention an iterative process is used to update the object guess. This is illustrated by the left hand box 33 in FIG. 3. An updated probe function guess is also iteratively calculated which is illustrated by the right hand box 34 in FIG. 3.

Referring to the update of the object guess a first step is to determine the exit wave front $\psi(r, R_k)$ at step 35. This is carried out using equation 1 noted above. A next step is to propagate the exit wave front to the measurement plane which is accomplished using a suitable model of propagation for the coherent wave front. The propagation is represented by the operator T where:

$$\Psi_k(u) = \mathcal{T}[\psi_k(r,R_k)] \qquad 2$$

The forward transform T shown as step 36 generates a propagated wave front $\Psi_k(u)$ where u references coordinates in the measurement plane. Since $\Psi_k(u)$ is complex-value this can be written as:

$$\Psi_k(u) = A_k(u) \exp(i\theta_k(u)) \qquad 3$$

Next this modelled wave front must be compared to a measured diffraction pattern. If the guessed-at object is correct then the following equality holds for every value of k.

$$A_k(u) = \sqrt{\Omega_k(u)} \qquad 4$$

The modulus of the propagated exit wave front equals the square root of the recorded diffraction pattern intensity. Generally this will not be the case as the guessed-at object will not correctly represent the true object at the sample points. To enforce the equality the modulus of the propagated exit wave front is replaced by the square root of the recorded diffraction pattern intensity as:

$$\Psi'_k(u) = \sqrt{\Omega_k(u)} \exp(i\theta_k(u)) \qquad 5$$

At step 37 the modulus of the propagated exit wave front is replaced by the square root of the recorded diffraction pattern intensity.

The corrected wave front is then propagated back to the plane of the object using the inverse propagation operator:

$$\psi'_k(r,R_k) = \mathcal{T}^{-1}[\Psi'_k(u)] \qquad 6$$

This inverse propagation step 39 provides the corrected exit wave form $\psi'_k(r, R_k)$. An update step 40 is then calculated to produce an improved object guess $O_{k+1}(r)$. The update step 40 is carried out according to:

$$O_{k+1}(r) = O_k(r) + \alpha \frac{P_k^*(r-R)}{|P_k(r-R)|^2_{max}} (\psi'_k(r,R) - \psi_k(r,R)) \qquad 7$$

This update function is labelled U1 in FIG. 3 which generates the update of the object guess $O_{k+1}(r)$. The parameter $\alpha$ governs the rate of change of the object guess. This value should be adjusted between 0 and 2 as higher values may lead to instability in the updated object guess. According to embodiments of the present invention the probe function is reconstructed in much the same manner as the object function. Aptly the probe function guess is carried out concurrently with the update of the object guess. (It will be appreciated that the Probe Function could optionally be updated more often or less often then the Object Function). In order to achieve this a further diffraction pattern is recorded in the measurement plane with the target object removed from the system. This further diffraction pattern may be recorded prior to the target object being put in place or subsequent to removal of the target object after the previously mentioned diffraction patterns have been used or may be a combination of diffraction patterns recorded before and after the target object is duly located.

Figure 4:
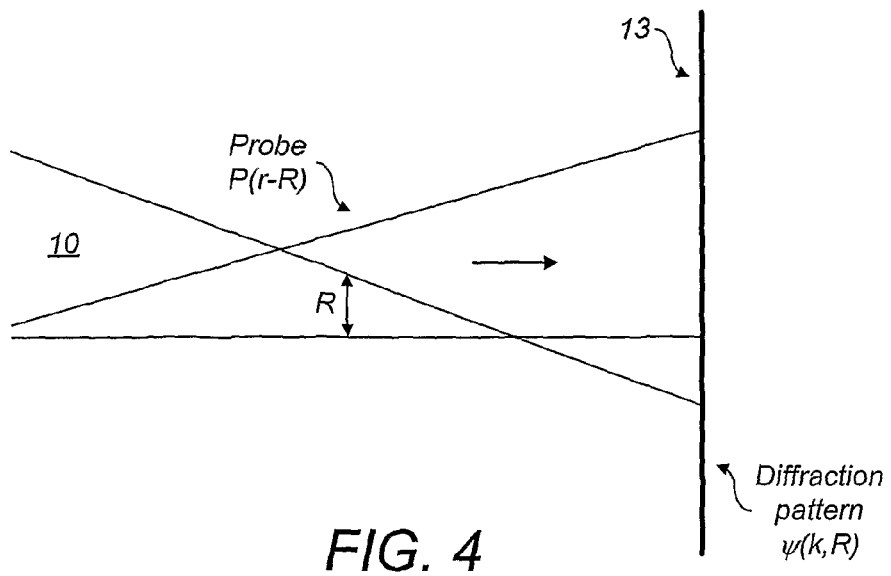
FIG. 4 illustrates a Probe Function and formation of a diffraction pattern without a target object.

That is to say the diffraction pattern of the probe function itself is recorded. This is denoted as the measurement $\Omega_P(u)$. The measurement of this diffraction pattern is illustrated in FIG. 4.

At step 32 $P_0(r)$ is chosen as an initial guess at the probe function which may be random or an approximation based on previous other measurements or calculations. Proceeding in a similar manner to the correction/update steps detailed above the probe function guess is propagated with a transform to the measurement plane so that:

$$\Psi_k(u) = \mathcal{T}[P_k(r)] \qquad 8$$

which can be written as:

$$\Psi_k(u) = B_k(u) \exp(i\gamma_k(u)) \qquad 9$$

A correction step 43 is then implemented by replacing the modulus of this propagated wave front with that recorded without the target object in the measurement plane 44.

The corrected wave front is then inverse propagated back at step 45 to give:

$$P'_k(r) = \mathcal{T}^{-1}[\Psi'_k(u)] \qquad 11$$

An update step 46 makes use of an update function U2 which is:

$$P_{k+1}(r) = P_k(r) + \beta \frac{O_k^*(r-R)}{|O_k(r-R)|^2_{max}} (P'_k(r) - \psi_k(r,R)) \qquad 12$$

The result of this update function generates the running estimate for the probe function. The parameter $\beta$ governs the rate of change of the probe guess. This value should be adjusted between 0 and 2 as higher values may lead to instability in the updated probe guess. The running guess for the probe function may be used at step 35 for generating the exit wave front as well as producing the new estimate to be transformed at step 42 to update the running estimate of the probe function itself in the next iteration.

Figure 5:
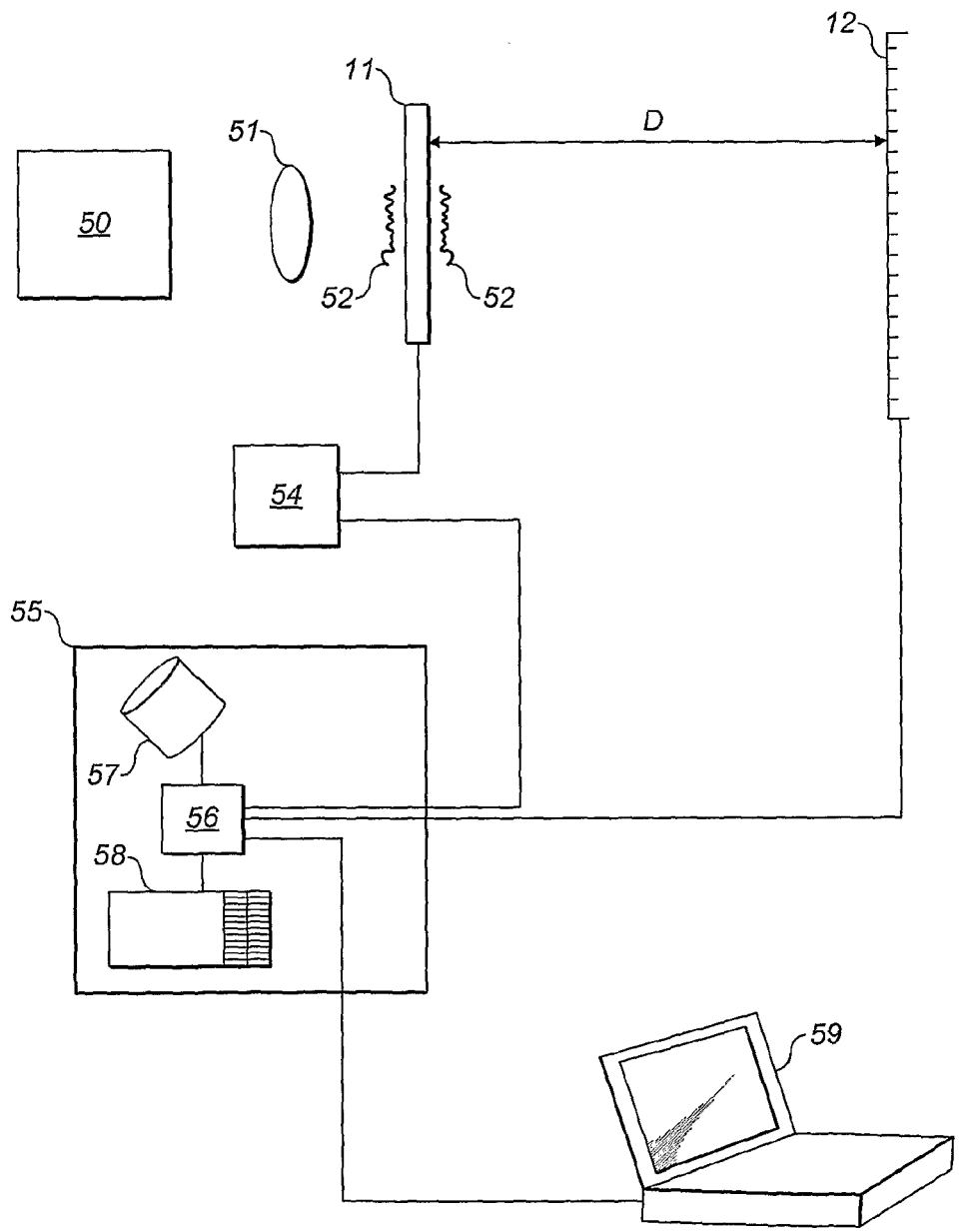
FIG. 5 illustrates an apparatus for providing imaged data that may be used to construct a high resolution image according to embodiments of the FIGS. 1-2.

FIG. 5 illustrates apparatus for providing image data which may be used to construct a high-resolution image of a region of a target object according to the above-described embodiment illustrated in FIGS. 1 and 2. A source of radiation 50 provides illumination onto a lens 51 which weakly focuses the radiation onto a selected region of a target 11. The incident radiation has an incident wave function 52 and an exit wave function 53. This exit wave function is propagated across distance D where a diffraction pattern is formed on an array of detectors 12. The distance D is advantageously sufficiently long so that the propagated exit wave function 53 forms a Fourier diffraction pattern in the far-field. The detector array provides at least one detector which can detect the intensity of radiation scattered by the target object 11. A locating device 54 is provided which may be a micro actuator and this can locate the target object at one or more locations as desired with respect to the target object. In this way radiation from source 50 may be made incident on different locations of the upstream surface of the target 11.

Alternatively, in some applications it may be advantageous for the distance D to be sufficiently small so that the propagated exit wave function 53 forms a Fresnel diffraction pattern on the detector array in the near field.

A control unit 55 provides control signals to the micro actuator and also receives intensity measurement results from each of the pixel detectors in the detector array 12. The control unit 55 includes a microprocessor 56 and a data store 57 together with a user interface 58 which may include a user display and a user input key pad. The control unit may be connected to a further processing device such as a laptop 59 or PC for remote control. Alternatively it will be understood that the control unit 55 could be provided by a laptop or PC. The control unit 55 can automatically control the production of image data in real time. Alternatively a user can use the user interface 58 to select areas of the target object for imaging or provide further user input.

In use the source of radiation 50 illuminates the lens 51 with radiation. The target object 11 is selectively located by the actuator 54 under control of the control unit 55. The radiation forms a diffraction pattern detected at respective locations by each of the detectors in the detector array 12. Results from these detectors is input to the control unit and may be stored in the data store 57. If only one position is being used to derive image data the microprocessor uses this detected information together with program instructions including information about the algorithm above-noted to derive the image data. However if one or more further positions are required prior to finalizing the image data the control unit next issues signals to the actuator 54 which locates the specimen at another selected location. The actuator may place the specimen at one of many different positions. After relocation a further diffraction pattern formed on the detector array is measured and the results stored in the control unit. As an example the array 12 may be a CCD array of 1200×1200 pixels. If no further intensity measurements are required image data may at this stage be generated by the control unit in accordance with the two newly stored sets of results using the algorithm above-noted. The raw image data may be displayed or a high-resolution image generated from the image data may be displayed on the user interface 1209 or remote display on a PC or other such device. Alternatively or additionally the image data itself may be utilised to determine characteristics associated with the target object (for example by data values being compared with predetermined values.

The actuator can be used to move the target object out of the optical path to enable the diffraction pattern without target object to be measured. Alternatively this movement may be effected by another actuator (not shown) or by user interference.

According to a further embodiment of the invention, a diffuser covers a post-target aperture. The diffuser is arranged to diffuse the wavefront from the target such that the radiation incident on the sample is spread more evenly over all diffraction angles in the measured diffraction pattern. By performing the measurements required to recover the illumination function, or probe function, with the diffuser in place, the effect of the diffuser can be automatically recovered as well. Thus, the diffuser may diffuse the wavefront from the target in an arbitrary way, and it is not necessary to know a priori the nature of the diffuser.

The presence of the diffuser leads to a reduction in the dynamic range of the diffraction pattern. As most detectors have limited dynamic range, reducing the dynamic range of the diffraction pattern may allow a more faithful representation of the diffraction pattern to be determined. Furthermore, as the radiation incident on the sample is spread more evenly over all diffraction angles, the incident flux required to provide the image data may be reduced, thereby reducing the possibility of causing damage to the target object.

Any type of diffuser having an arbitrary transfer function may be used. As will be understood by the skilled man, the choice of diffuser will depend on the properties of the radiation used, and the desired diffusion effect. For example, for visible light the diffuser may comprise a ground glass diffuser.

According to a further embodiment of the invention, a diffuser having a known transfer function may be used in conjunction with a known probe function. Such an arrangement allows the diffused probe function to be calculated, allowing the object function to be determined using a precalculated probe function.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A method of providing image data for constructing an image of a region of a target object, comprising the steps of:
providing incident radiation from a radiation source at a target object and, via at least one detector, detecting an intensity of radiation scattered by the target object;
estimating an object function indicating at least one characteristic of a region of the target object;
estimating a probe function indicating at least one characteristic of the incident radiation; and
providing image data via an iterative process responsive to the detected intensity of radiation scattered by the target object, wherein in said iterative process each of the object function and probe function are iteratively re-estimated step by step with a running estimate of the probe function being utilized to determine a running estimate of the object function associated with the target object.

2. The method as claimed in claim 1, wherein the iteratively re-estimating the object function and the probe function comprises the steps of:
multiplying the estimated object function by the estimated probe function to thereby provide an exit wave function;
propagating the exit wave function to provide an estimate of an expected scattering pattern; and
correcting at least one characteristic of said expected scattering pattern according to a detected intensity of radiation scattered by the target object.

3. The method as claimed in claim 2, further comprising the steps of:
inverse propagating a corrected expected scattering pattern to thereby provide an updated exit wave function; and
updating the running estimate of the object function responsive to the updated exit wave function.

4. The method as claimed in claim 3, wherein the object function is updated according to:

$$O_{k+1}(r) = O_k(r) + \alpha \frac{P_k^*(r-R)}{|P_k(r-R)|_{max}^2}(\psi'_k(r,R) - \psi_k(r,R))$$

where $O_k(r)$ is the current (kth) estimate of the object function, $\psi_k(r, R)$ is the current exit wave, $\psi'_k(r, R)$ is the updated exit wave whose Fourier Transform or Fresnel Transform has been corrected and $P_k(r-R)$ is the current (kth) estimate of the illumination function, $\alpha$ is a constant whose value can be adjusted to optimize the performance of the algorithm.

5. The method as claimed in claim 1, further comprising the steps of:
propagating the estimated probe function to provide an estimate of an expected targetless scattering pattern; and
correcting at least one characteristic of said expected targetless scattering pattern according to an intensity of radiation detected absent said target object.

6. The method as claimed in claim 1, further comprising the steps of:
inverse propagating a corrected expected targetless scattering pattern to thereby provide the running estimate for the probe function; and
updating the running estimate of the probe function responsive to the updated probe function.

7. The method as claimed in claim 6, wherein the probe function is updated according to:

$$P_{k+1}(r) = P_k(r) + \beta \frac{O_k^*(r-R)}{|O_k(r-R)|_{max}^2}(P'_k(r) - \psi_k(r,R))$$

where $O_k(r)$ is the current (kth) estimate of the object function, $\psi_k(r, R)$ is the current exit wave, $P'_k(r)$ is the updated illumination function whose Fourier Transform has been corrected using the measurement $\Omega_P(u)$ and $P_k(r)$ is the current (kth) estimate of the illumination function, and $\beta$ is a constant whose value can be adjusted to optimize the performance of the algorithm.

8. The method as claimed in claim 7, wherein the estimated probe function is propagated to provide an estimate scattering pattern in a measurement plane of $$\Phi_k(u) = \mathcal{T}[P_k(r)]$$

where the propagation operator $\mathcal{T}$ suitably models the propagation between the plane of the object and the measurement plane, wherein $\mathcal{T}$ comprises a Fourier Transform or a Fresnel Transform, $\Phi_k(u)$ is the propagated kth illumination function guess, whose modulus must match the recording $\Omega_P(u)$, and $P_k(r)$ is the current (kth) estimate of the illumination function.

9. The method as claimed in claim 8, wherein the corrected targetless scattering pattern is inversely propagated back to an object plane as $$P'_k(r) = \mathcal{T}^{-1}[\Phi'_k(u)]$$

where the propagation operator $\mathcal{T}^{-1}$ suitably models the propagation between the measurement plane and the plane of the object, wherein $\mathcal{T}^{-1}$ comprises an Inverse Fourier Transform or an Inverse Fresnel Transform, $P'_k(r)$ is the corrected illumination function in the plane of the object and $\Phi'_k(u)$ is the corrected diffraction pattern whose modulus matches the recorded modulus of the illumination function.

10. The method as claimed in claim 1, further comprising the steps of:
updating the running estimate of the probe function and the running estimate of an object function simultaneously with each iteration.

11. The method as claimed in claim 1, further comprising the steps of:
detecting the intensity of radiation scattered by the target object with the incident radiation or a post target aperture at a first position with respect to the target object;
re-positioning the incident radiation or post-target aperture at least one further position relative to the target object;
subsequently detecting the intensity of radiation scattered by the target object with the incident radiation or post-target aperture at the at least one further position; and
providing the image data responsive to the intensity of radiation detected as scattered at the first and at least one further position.

12. The method as claimed in claim 11, further comprising the steps of:
estimating the object function indicating at least one characteristic of said region of the target object; and
estimating the probe function indicating at least one characteristic of incident radiation at the target object or the post-target aperture.

13. The method as claimed in claim 1, further comprising the steps of:
detecting the intensity of radiation provided absent the target object before and/or after locating a target object between the radiation source and the detector.

14. The method as claimed in claim 1, further comprising the steps of:
providing an initial estimate of the probe function as a prior modelled probe function or by providing a random approximation for the probe function.

15. The method as claimed in claim 1, further comprising providing a diffuser arranged to diffuse radiation detected at the detector.

16. The method as claimed in claim 1, wherein the target object is at least partially transparent to the incident radiation and detecting an intensity of radiation scattered by the target object comprises detecting an intensity of radiation transmitted by the target object.

17. The method as claimed in claim 1, wherein the target object is at least partially reflective to the incident radiation and detecting an intensity of radiation scattered by the target object comprises detecting an intensity of radiation reflected by the target object.

18. Apparatus for providing image data for generating an image of a region of a target object, comprising:
- a locating device for locating a target object at a predetermined location;
- a radiation source for providing incident radiation at a target object located by the locating device;
- at least one detector device for detecting an intensity of radiation scattered by the target object locating device for locating incident radiation or a post-target aperture at one or more locations with respect to the target object;
- a memory storing an object function indicating at least one characteristic of a region of the target object and a probe function indicating at least one characteristic of the incident radiation; and
- a processor for providing image data via an iterative process responsive to a detected intensity of radiation scattered by the target object, wherein in said iterative process the processor is configured to iteratively re-estimate each of the object function and the probe function step by step with a running estimate of the probe function being utilized to determine a running estimate of the object function associated with the target object.

19. The apparatus as claimed in claim 18, wherein the incident radiation is substantially localized.

20. The apparatus as claimed in claim 18, further comprising a diffuser arranged to diffuse radiation detected at the detector.

21. The apparatus as claimed in claim 20, wherein the diffuser is located within a post target aperture.

22. A non-transitory computer-readable data storage medium having instructions stored thereon which, when executed by a computer, perform the method as claimed in claim 1.

* * * * *